United States Patent
Kemmerling et al.

(10) Patent No.: US 9,828,922 B2
(45) Date of Patent: Nov. 28, 2017

(54) SUPERCHARGED INTERNAL COMBUSTION ENGINE WITH EXHAUST-GAS TURBOCHARGER AND METHOD FOR OPERATING AN INTERNAL COMBUSTION ENGINE OF SAID TYPE

(71) Applicant: Ford Global Technologies, LLC, Dearborn, MI (US)

(72) Inventors: Joerg Kemmerling, Monschau (DE); Helmut Matthias Kindl, Aachen (DE); Vanco Smiljanovski, Bedburg (DE); Franz Arnd Sommerhoff, Aachen (DE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 193 days.

(21) Appl. No.: 14/812,837

(22) Filed: Jul. 29, 2015

(65) Prior Publication Data

US 2016/0047324 A1    Feb. 18, 2016

(30) Foreign Application Priority Data

Aug. 14, 2014 (DE) .......... 10 2014 216 162

(51) Int. Cl.
   *F02B 33/44*    (2006.01)
   *F02D 41/00*    (2006.01)
   (Continued)

(52) U.S. Cl.
   CPC .......... *F02D 41/0007* (2013.01); *F02B 39/00* (2013.01); *F02C 3/34* (2013.01); *F02M 25/071* (2013.01); *F02M 26/05* (2016.02); *F02M 26/06* (2016.02); *F02M 26/09* (2016.02); *F02M 26/17* (2016.02); *F04D 29/4213* (2013.01); *F04D 29/441* (2013.01); *F04D 29/661* (2013.01); *F02B 2037/125* (2013.01);
   (Continued)

(58) Field of Classification Search
   CPC ........ F02M 26/05–26/07; F02M 26/09; F02M 26/17; F04D 29/4213
   USPC ............................ 60/605.2, 602; 123/568.11
   See application file for complete search history.

(56) References Cited

U.S. PATENT DOCUMENTS 2,336,010 A * 12/1943 Gregory .............. F04D 29/4213
                                                      123/564
4,461,150 A *  7/1984 Grohn .................... F02M 26/19
                                                      123/568.17
(Continued)

FOREIGN PATENT DOCUMENTS

DE    102012209230 A1    12/2013
DE    EP 3051099 A1 *  8/2016 ............ F01D 17/14
(Continued)

*Primary Examiner* — Ngoc T Nguyen
(74) *Attorney, Agent, or Firm* — Julia Voutyras; McCoy Russell LLP (57) ABSTRACT

Embodiments for inducing swirl upstream of a compressor are provided. In one example, a method includes during a first condition, flowing exhaust gas from downstream of a turbine to upstream of a compressor via a tangential flow duct of an exhaust gas recirculation (EGR) injector circumferentially surrounding an intake passage upstream of the compressor, and during a second condition, flowing exhaust gas from downstream of the turbine to upstream of the compressor via a radial flow duct of the EGR injector.

19 Claims, 6 Drawing Sheets

(51) Int. Cl.

| | | |
|---|---|---|
| *F02B 39/00* | (2006.01) | |
| *F02M 25/07* | (2006.01) | |
| *F04D 29/66* | (2006.01) | |
| *F02C 3/34* | (2006.01) | |
| *F04D 29/42* | (2006.01) | |
| *F04D 29/44* | (2006.01) | |
| *F02M 26/05* | (2016.01) | |
| *F02M 26/06* | (2016.01) | |
| *F02M 26/09* | (2016.01) | |
| *F02M 26/17* | (2016.01) | |
| *F02B 37/12* | (2006.01) | |

(52) U.S. Cl.
CPC . *F02D 41/0065* (2013.01); *F02M 2025/0763* (2013.01); *F05D 2220/40* (2013.01); *F05D 2250/51* (2013.01); *F05D 2270/101* (2013.01); *Y02T 10/144* (2013.01)

(56) References Cited

U.S. PATENT DOCUMENTS

| | | | |
|---|---|---|---|
| 6,272,851 B1 * | 8/2001 | Mori | F02M 26/19 123/568.17 |
| 7,140,357 B2 * | 11/2006 | Wei | F02M 26/19 123/568.17 |
| 7,243,641 B2 * | 7/2007 | Zukouski | F02M 26/05 123/568.17 |
| 8,177,498 B2 | 5/2012 | Hermann et al. | |
| 8,925,529 B2 * | 1/2015 | van Hal | F02M 26/19 123/568.17 |
| 2007/0266705 A1 * | 11/2007 | Wood | F04D 29/4213 60/599 |
| 2008/0134678 A1 * | 6/2008 | Noelle | F02M 26/06 60/605.2 |
| 2011/0011379 A1 * | 1/2011 | Jackson | F02M 25/06 60/605.1 |
| 2011/0083646 A1 * | 4/2011 | Siuchta | F02M 29/06 123/564 |
| 2013/0266436 A1 | 10/2013 | Ibaraki et al. | |
| 2017/0022941 A1 * | 1/2017 | Mallard | F02M 26/07 |

FOREIGN PATENT DOCUMENTS

| | | |
|---|---|---|
| JP | 2007154675 A | 6/2007 |
| JP | 2010090806 A | 4/2010 |
| WO | 2009068181 A1 | 6/2009 |
| WO | 2011108093 A1 | 9/2011 |

* cited by examiner

SUPERCHARGED INTERNAL COMBUSTION ENGINE WITH EXHAUST-GAS TURBOCHARGER AND METHOD FOR OPERATING AN INTERNAL COMBUSTION ENGINE OF SAID TYPE

CROSS REFERENCE TO RELATED APPLICATIONS

The present application claims priority to German Patent Application No. 102014216162.2, filed Aug. 14, 2014, the entire contents of which are hereby incorporated by reference for all purposes.

FIELD

The disclosure relates to a supercharged internal combustion engine.

BACKGROUND/SUMMARY

An internal combustion engine may be used as a motor vehicle drive unit. Within the context of the present disclosure, the expression "internal combustion engine" encompasses diesel engines and Otto-cycle engines and also hybrid internal combustion engines, which utilize a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

In recent years, there has been a trend in development toward small, highly supercharged engines, wherein supercharging is primarily a method of increasing power, in which the air required for the combustion process in the engine is compressed. The economic significance of said engines for the automotive engineering industry is ever increasing.

For supercharging, use is often made of an exhaust-gas turbocharger, in which a compressor and a turbine are arranged on the same shaft. The hot exhaust-gas flow is supplied to the turbine and expands in the turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the cylinders is obtained. A charge-air cooler is commonly provided in the intake system downstream of the compressor, by means of which charge-air cooler the compressed charge air is cooled before it enters the at least one cylinder. The cooler lowers the temperature and thereby increases the density of the charge air, such that the charge-air cooler also contributes to improved charging of the cylinders, that is to say to a greater air mass. Compression by cooling takes place.

The advantage of an exhaust-gas turbocharger in relation to a mechanical charger is that no mechanical connection for transmitting power exists or is required between charger and internal combustion engine. While a mechanical charger extracts the energy required for driving it entirely from the internal combustion engine, and thereby reduces the output power and consequently adversely affects the efficiency, the exhaust-gas turbocharger utilizes the exhaust-gas energy of the hot exhaust gases.

As already mentioned, supercharging serves for increasing power. The air required for the combustion process is compressed, as a result of which a greater air mass can be supplied to each cylinder per working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In any case, supercharging leads to an increase in volumetric power output and an improved power-to-weight ratio. If the swept volume is reduced, it is thus possible to shift the load collective toward higher loads, at which the specific fuel consumption is lower.

Supercharging consequently assists in the constant efforts in the development of internal combustion engines to minimize fuel consumption, that is to say to improve the efficiency of the internal combustion engine.

It is a further basic aim to reduce pollutant emissions. Supercharging can likewise be expedient in solving this problem. With targeted configuration of the supercharging, it is possible specifically to obtain advantages with regard to efficiency and with regard to exhaust-gas emissions. To adhere to future limit values for pollutant emissions, however, further engine-internal measures are necessary in addition to the supercharging arrangement. For example, exhaust-gas recirculation serves for reducing the untreated nitrogen oxide emissions. Here, the exhaust-gas recirculation rate $x_{EGR}$ is determined as $x_{EGR} = m_{EGR}/(m_{EGR} + m_{fresh\ air})$, where $m_{EGR}$ denotes the mass of recirculated exhaust gas and $m_{fresh\ air}$ denotes the supplied fresh air.

Problems are encountered in the configuration of the exhaust-gas turbocharging, wherein it is basically sought to obtain a noticeable performance increase in all engine speed ranges. According to the prior art, a severe torque drop is however observed in the event of a certain engine speed being undershot.

Said torque drop is understandable if one takes into consideration that the charge pressure ratio is dependent on the turbine pressure ratio. If the engine speed is reduced, this leads to a smaller exhaust-gas mass flow and therefore to a lower turbine pressure ratio. Consequently, toward lower engine speeds, the charge pressure ratio likewise decreases. This equates to a charge pressure drop or torque drop.

In practice, the relationships described above often lead to the use of a small exhaust-gas turbocharger, that is to say an exhaust-gas turbocharger with a small turbine cross section, whereby the turbine pressure ratio can be increased. This however impairs the supercharging at high engine speeds, and merely shifts the torque drop toward lower engine speeds. Furthermore, said approach, that is to say the reduction in size of the turbine cross section, is subject to limits because the desired supercharging and performance increase should be possible without restriction and to the desired extent even at high engine speeds.

In the prior art, it is sought, using a variety of measures, to improve the torque characteristic of a supercharged internal combustion engine.

It is sought to do this for example by means of a small design of the turbine cross section and simultaneous exhaust-gas blow-off, wherein the exhaust-gas blow off can be controlled by means of charge pressure or by means of exhaust-gas pressure. Such a turbine is also referred to as a wastegate turbine. If the exhaust-gas mass flow exceeds a critical value, a part of the exhaust-gas flow is, within the course of the so-called exhaust-gas blow-off, conducted via a bypass line past the turbine. Said approach however—as already discussed above—has the disadvantage that the supercharging behavior is inadequate at relatively high engine speeds.

The torque characteristic of a supercharged internal combustion engine may furthermore be improved by means of multiple turbochargers arranged in parallel, that is to say by means of multiple turbines of relatively small turbine cross section arranged in parallel, wherein turbines are activated successively with increasing exhaust-gas flow rate.

The torque characteristic may also be advantageously influenced by means of multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the engine characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows, which considerably improves the torque characteristic in the lower engine speed range. This is achieved by designing the high-pressure turbine for small exhaust-gas mass flows and by providing a bypass line by means of which, with increasing exhaust-gas mass flow, an increasing amount of exhaust gas is conducted past the high-pressure turbine. For this purpose, the bypass line branches off from the exhaust-gas discharge system upstream of the high-pressure turbine and opens into the exhaust-gas discharge system again upstream of the low-pressure turbine. In the bypass line there is arranged a shut-off element for controlling the exhaust-gas flow conducted past the high-pressure turbine.

Shifting the surge limit of the compressor of an exhaust-gas turbocharging arrangement further, or as far as possible, toward small compressor flows is also advantageous for other reasons.

In the case of small compressor flows, the speed of the charge-air flow relative to the intake system decreases to such an extent that the flow approaching the rotating impeller blades runs at an excessively large angle, and the charge-air flow detaches from the airfoil-like blades. The resulting pressure fluctuations on the blades lead to increased noise emissions, and possibly to damage of the blades. Further adverse effects that can arise are mass flow fluctuations and a severe decrease in efficiency.

This effect can be counteracted by means of a variable compressor geometry. By adjustment of the blades of a guide wheel provided upstream, it is possible for the flow approaching the rotating impeller blades, that is to say the approaching-flow angle, to be manipulated to a limited extent, whereby the surge limit of the compressor is shifted in the compressor characteristic map toward small compressor flows.

Equipping a compressor with a variable compressor geometry is however expensive. Furthermore, the capacity for manipulation by means of a variable compressor geometry is also subject to limits, as an adjustment of the guide wheel is possible only to a certain extent. Furthermore, in the case of relatively large compressor flows, a guide device constitutes a flow resistance, and is thus somewhat obstructive.

The inventors herein have recognized the above issues and provide a method to at least partly address them. In one example a method, comprises during a first condition, flowing exhaust gas from downstream of a turbine to upstream of a compressor via a tangential flow duct of an exhaust gas recirculation (EGR) injector circumferentially surrounding an intake passage upstream of the compressor, and during a second condition, flowing exhaust gas from downstream of the turbine to upstream of the compressor via a radial flow duct of the EGR injector.

In this way, EGR flow may be provided to upstream of a compressor via a radial flow and/or tangential flow duct of an injector that circumferentially surrounds the intake passage upstream of the compressor. The portion of EGR that flows through each respective flow duct may be controlled by a control valve. During conditions of compressor surge, for example, more EGR may be directed through the tangential flow duct in order to create swirl upstream of the compressor in a direction equal to the direction of compressor rotation. In doing so, compressor surge may be mitigated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

In part load and/or low speed conditions in a turbocharged engine, the mass flow through the compressor is relatively low, leading to operation very close or even within the surge area of the compressor map. This can cause acoustic and durability issues due to pressure fluctuation at the compressor blades (stall situation at the blades). Sensitivity to surge can be reduced compressor configurations that enable low mass flow operation without stall at the compressor blades. If the air entering the compressor shows a swirl in the same direction as the compressor wheel turns, the resulting angle of attack is reduced. This improves the flow at the compressor blades (avoidance of stall effects) and moves the surge risk to lower mass flows. Depending on the air mass flow and the compressor speed, the required level of swirl motion will vary to avoid surge conditions.

According to examples disclosed herein, a switchable exhaust gas recirculation (EGR) injector induces variable levels of swirl motion just upstream of a compressor to avoid surge and compressor stall at low air mass flows. EGR from a low-pressure system (LP-EGR) may be preferably injected just upstream of the compressor to avoid condensate upstream of the compressor when hot EGR is mixed with cool ambient air. The LP-EGR injector described herein includes a sector divided ring around the compressor inlet that is supplied with EGR from a LP-EGR system. The sector divided ring may include a first sector to provide EGR having a substantially radial velocity component and a second sector to provide EGR having a substantially tangential velocity component.

The tangential EGR flow ports in the compressor inlet wall are designed to inject EGR with a tangential velocity into the fresh air flow upstream of the compressor. This induces a swirl motion of the air/EGR mixture just upstream of the compressor in the same direction as the wheel rotates. By the subsequent reduction of the angle of attack at the compressor blades, the surge line is moved to lower mass flow conditions. The radial flow ports are designed to inject EGR without tangential velocity in order to induce no swirl.

A rotating valve may be positioned within the EGR supply passage. The valve may be configured to fully close one sector at both end points. In the middle valve position both sectors are fully open. In case the sector with tangential ports (e.g., the second sector) is fully open and the radial port sector (e.g., the first sector) is closed, the highest level of swirl is induced. In case the radial sector is fully open and the tangential sector is closed, no swirl is induced. Different induced swirl levels can be adjusted by moving the valve between the two endpoints (max. swirl-no swirl). For a given EGR mass flow, every desired swirl level can be adjusted, because induced swirl is only depending on valve position (for a constant EGR mass).

Figure 1:
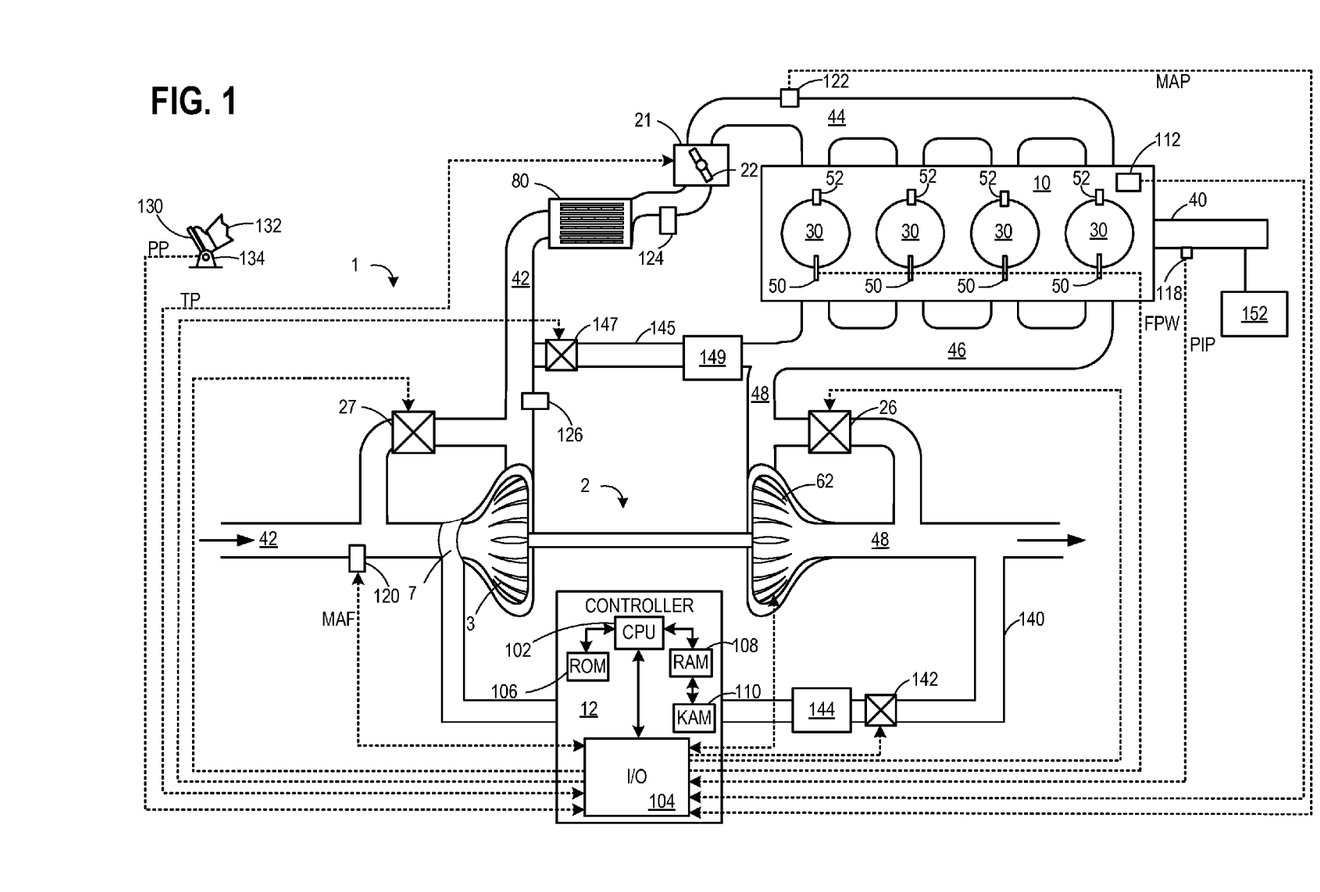
FIG. 1 is a schematic diagram of an example engine system including an exhaust gas recirculation system.
Figure 3:
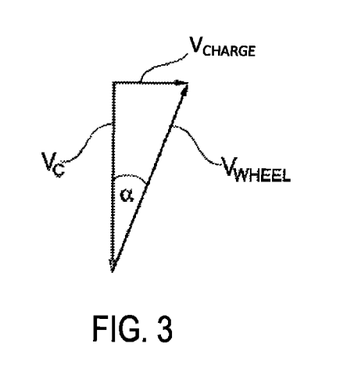
FIG. 3 shows an example speed triangle without EGR.
Figure 4:
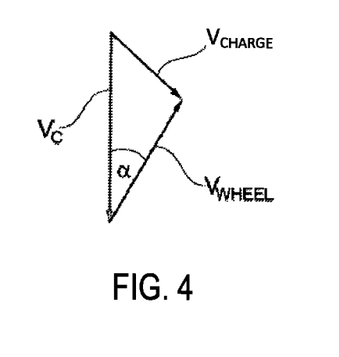
FIG. 4 shows an example speed triangle with EGR via the second annular duct.
Figure 7A:
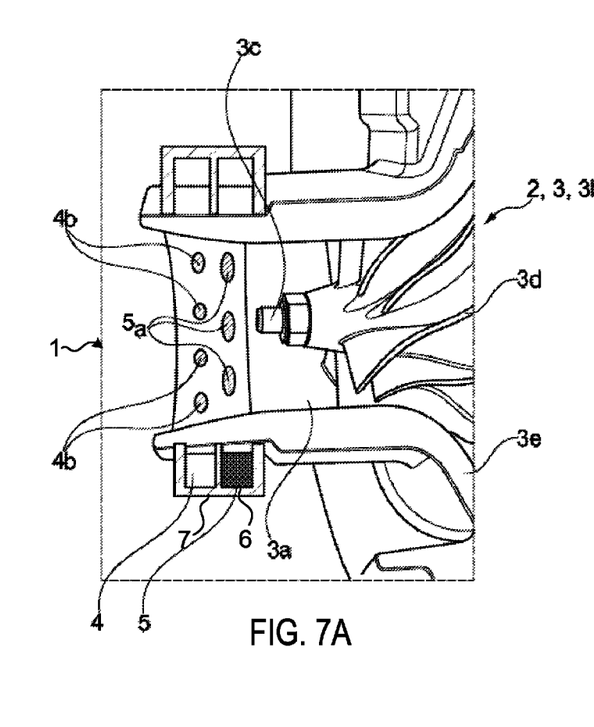
FIGS. 7A and 7B schematically show the compressor of FIG. 2 with the control element in various positions.
Figure 7B:
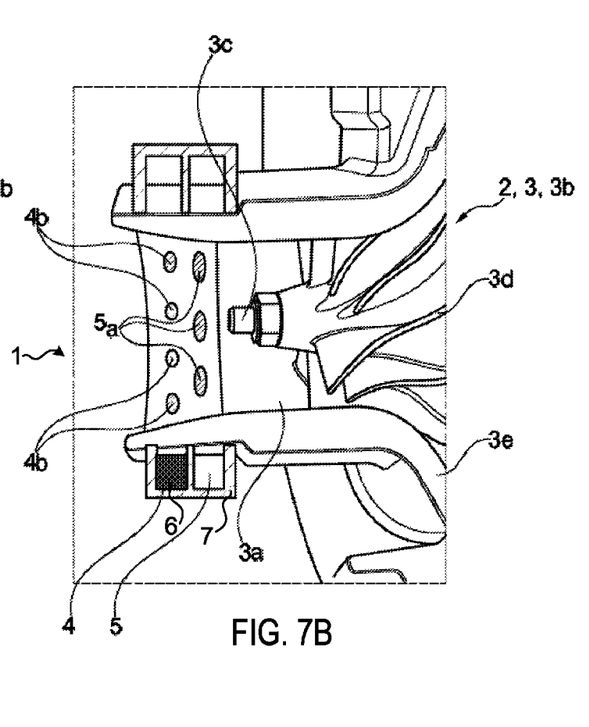
Figure 8:
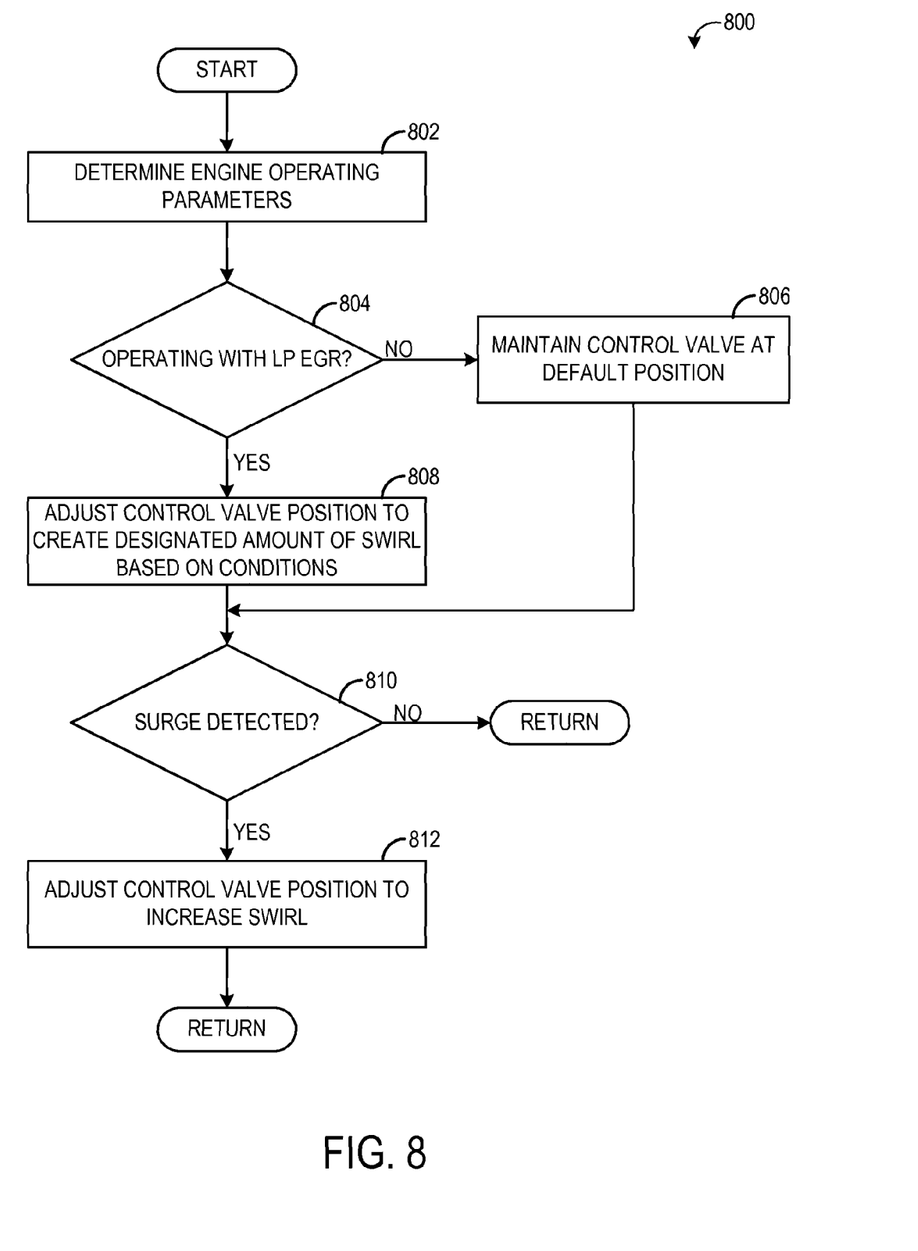
FIG. 8 is a flow chart illustrating a method for adjusting the swirl of EGR upstream of a compressor.

An engine system having a turbocharger and an EGR system to inject EGR upstream of a compressor is shown in FIG. 1. The compressor and EGR injector of FIG. 1 are shown in various cross-sections in FIGS. 2, 5, 6, 7A, and 7B. FIGS. 3 and 4 illustrate the speed vectors that may be produced when operating with and without EGR. FIG. 8 is a flow chart illustrating method for operating with the injector and compressor of FIG. 1.

FIG. 1 is a schematic diagram showing an example engine 10, which may be included in a propulsion system of an automobile. The engine 10 is shown with four cylinders or combustion chambers 30. However, other numbers of cylinders may be used in accordance with the current disclosure. Engine 10 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Each combustion chamber (e.g., cylinder) 30 of the engine 10 may include combustion chamber walls with a piston (not shown) positioned therein. The pistons may be coupled to a crankshaft 40 so that reciprocating motion of the piston is translated into rotational motion of the crankshaft. The crankshaft 40 may be coupled to at least one drive wheel of a vehicle and use engine output torque to propel the automobile. The crankshaft 40 may also be used to drive an alternator 152.

The combustion chambers 30 may receive intake air from an intake system 1 including an intake manifold 44 and may exhaust combustion gases via an exhaust manifold 46 to an exhaust passage 48 (also referred to herein as the exhaust). The intake manifold 44 and the exhaust manifold 46 can selectively communicate with the combustion chamber 30 via respective intake valves and exhaust valves (not shown). In some embodiments, the combustion chamber 30 may include two or more intake valves and/or two or more exhaust valves.

Fuel injectors 50 are shown coupled directly to the combustion chamber 30 for injecting fuel directly therein in proportion to the pulse width of signal FPW received from controller 12. In this manner, the fuel injector 50 provides what is known as direct injection of fuel into the combustion chamber 30; however it will be appreciated that port injection is also possible. Fuel may be delivered to the fuel injector 50 by a fuel system (not shown) including a fuel tank, a fuel pump, and a fuel rail.

In a process referred to as ignition, the injected fuel is ignited by known ignition means such as spark plug 52, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. In one example, spark may be retarded during a tip-in.

The intake system 1 also includes an intake passage 42. The intake manifold 44 may receive intake air from the intake passage 42. The intake passage 42 includes a throttle 21 having a throttle plate 22 to regulate flow to the intake manifold 44. In this particular example, the position (TP) of the throttle plate 22 may be varied by the controller 12 to enable electronic throttle control (ETC). In this manner, the throttle 21 may be operated to vary the intake air provided to the combustion chambers 30. For example, the controller 12 may adjust the throttle plate 22 to increase an opening of the throttle 21. Increasing the opening of the throttle 21 may increase the amount of air supplied to the intake manifold 44. In an alternate example, the opening of the throttle 21 may be decreased or closed completely to shut off airflow to the intake manifold 44. In some embodiments, additional throttles may be present in intake passage 42, such as a throttle upstream of a compressor 3 (not shown).

The engine 10 may further include a compression device such as a turbocharger 2 or supercharger including at least a compressor 3 arranged along the intake passage 42. For a turbocharger, the compressor 3 may be at least partially driven by a turbine 62, via, for example a shaft, or other coupling arrangement. The turbine 62 may be arranged along the exhaust passage 48. Various arrangements may be provided to drive the compressor. For a supercharger, the compressor 3 may be at least partially driven by the engine and/or an electric machine, and may not include a turbine. Thus, the amount of compression provided to one or more cylinders of the engine via a turbocharger or supercharger may be varied by the controller 12.

In the embodiment shown in FIG. 1, the compressor 3 may be driven primarily by the turbine 62. The turbine 62 may be driven by exhaust gases flowing through the exhaust passage 48. Thus, the driving motion of the turbine 62 may drive the compressor 3. As such, the speed of the compressor 3 may be based on the speed of the turbine 62. As the speed of the compressor 3 increases, more boost may be provided through the intake passage 42 to the intake manifold 44.

Further, the exhaust passage 48 may include a wastegate 26 for diverting exhaust gas away from the turbine 62. Additionally, the intake passage 42 may include a compressor bypass or recirculation valve (CRV) 27 configured to divert intake air around the compressor 3. The wastegate 26 and/or the CRV 27 may be controlled by the controller 12 to be opened when a lower boost pressure is desired, for example. For example, in response to compressor surge or a potential compressor surge event, the controller 12 may open the CRV 27 to decrease pressure at the outlet of the compressor 3. This may reduce or stop compressor surge. In some embodiments, the CRV 27 may be two position valve adjustable between a closed and an open position. In other embodiments, the CRV 27 may be a multiple position valve adjustable into a plurality of positions between fully opened and fully closed. As such, the CRV 27 may be adjusted to vary flow around the compressor 3.

The intake passage 42 may further include a charge air cooler (CAC) 80 (e.g., an intercooler) to decrease the temperature of the turbocharged or supercharged intake gases. In some embodiments, the CAC 80 may be an air to air heat exchanger. In other embodiments, the CAC 80 may be an air to liquid heat exchanger. The CAC 80 may also be a variable volume CAC. Hot charge air (boosted air) from the compressor 3 enters the inlet of the CAC 80, cools as it travels through the CAC, and then exits to pass through the throttle 21 and then enter the engine intake manifold 44. Ambient air flow from outside the vehicle may enter engine 10 through a vehicle front end and pass across the CAC, to aid in cooling the charge air.

Further, in the disclosed embodiments, an exhaust gas recirculation (EGR) system may route a desired portion of exhaust gas from the exhaust passage 48 to the intake passage 42 via an EGR passage, such as EGR passage 140. The amount of EGR provided to the intake passage 42 may be varied by the controller 12 via an EGR valve, such as EGR valve 142. Under some conditions, the EGR system may be used to regulate the temperature of the air and fuel mixture within the combustion chamber. The EGR passage 140 may further include an EGR cooler 144 for cooling exhaust gases traveling through the EGR passage 140. The EGR passage 140 routes EGR from downstream of the turbine 62 and directly to the compressor 3 or upstream of the compressor 3. In the examples illustrated herein, the EGR passage 140 routes EGR from downstream of the turbine 62 to upstream of the compressor 3 via an EGR injector 7 that circumferentially surrounds the intake passage 42 upstream of the compressor 3. The EGR injector may include one or more ducts or flow passages, flow ports, etc., to introduce the EGR into the intake air stream before entering the compressor. Additional details regarding the EGR injector 7 will be discussed below with respect to FIGS. 2-8.

In some embodiments, the engine 10 may also include a high pressure (HP) EGR system in addition to the low pressure (LP) EGR system described above, where EGR is routed from upstream of the turbine 62 to downstream of the compressor 3 via a second EGR passage 145 controlled by a second EGR valve 147 and cooled by a second EGR cooler 149.

The controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10 for performing various functions to operate the engine 10. In addition to those signals previously discussed, these signals may include measurement of inducted mass air flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors that may send signals to controller 12 include a temperature and/or pressure sensor 124 at an outlet of a charge air cooler 80, and a boost pressure sensor 126. Other sensors not depicted may also be present, such as a sensor for determining the intake air velocity at the inlet of the charge air cooler, a sensor for determining intake air humidity, and other sensors.

As described above, the exhaust-gas turbocharged internal combustion engine according to the disclosure may be equipped with a high-pressure EGR arrangement and with a low-pressure EGR arrangement.

In contrast to a high-pressure EGR arrangement, in which exhaust gas extracted from the exhaust-gas discharge system upstream of the turbine is introduced into the intake system downstream of the compressor, in the case of a low-pressure EGR arrangement exhaust gas which has already flowed through the turbine is recirculated to the inlet side. For this purpose, the low-pressure EGR arrangement comprises a recirculation line system which branches off from the exhaust-gas discharge system downstream of the turbine and issues into the intake system upstream of the compressor.

The main advantage of the low-pressure EGR arrangement in relation to the high-pressure EGR arrangement is that the exhaust-gas flow introduced into the turbine during exhaust-gas recirculation is not reduced by the recirculated exhaust-gas flow rate. The entire exhaust-gas flow is always available at the turbine for generating an adequately high charge pressure.

The exhaust gas which is recirculated via the low-pressure EGR arrangement to the inlet side, and preferably cooled, is mixed with fresh air upstream of the compressor. The mixture of fresh air and recirculated exhaust gas produced in this way forms the charge air which is supplied to the compressor and compressed.

Here, the fact that exhaust gas is conducted through the compressors during the course of the low-pressure EGR is not detrimental, because exhaust gas is preferably used which has been subjected to exhaust-gas aftertreatment, in particular in a particle filter, downstream of the turbine. There is therefore little risk of depositions in the compressor which change the geometry of the compressor, in particular the flow cross sections, and thereby impair the efficiency of the compressor.

According to the disclosure, the recirculation line system of the low-pressure EGR arrangement enters into the intake system via an injector that comprises at least two annular ducts, from each of which there extend multiple flow ports which are connected in terms of flow to the intake system.

The annular ducts may be of different designs. Whereas the flow ports of the first annular duct are oriented substantially radially with respect to the virtual elongation of the shaft of the compressor, and serve primarily for the introduction of exhaust gas into the intake system, the flow ports of the second annular duct are oriented in the manner of a secant or a tangent, such that the exhaust gas emerging in radiant configuration from said flow ports forms a vortex around the shaft of the compressor.

With the flow ports of the second annular duct, it is thus possible, in particular in the presence of small compressor flows, to manipulate the speed of the charge-air flow relative to the compressor impeller, that is to say the speed vector of the approaching flow, wherein the degree of manipulation can be set by means of the exhaust-gas flow rate emerging from the flow ports. The speed vector of the charge-air flow has an additional component imparted to it by the exhaust-gas vortex, such that the angle of the flow approaching the rotating impeller blades of the compressor can be varied. The corresponding speed triangles will be explained in detail below with respect to FIG. 1b, wherein the effect according to the disclosure will be made clear.

Detachment of the charge-air flow from the airfoil-like blades of the compressor impeller can be counteracted, whereby increased noise emissions, and damage to the blades, can be avoided or reduced.

The surge limit of the compressor in the compressor characteristic map can be shifted further toward small compressor flows. The measure according to the disclosure is inexpensive by comparison with equipping the compressor with a variable compressor geometry, in particular if it is considered that modern internal combustion engines generally have an exhaust-gas recirculation arrangement in any case, which may merely be equipped with the features of the recirculation line system according to the disclosure. Furthermore, in the presence of relatively large compressor flows, the annular ducts do not pose a flow resistance, by contrast to a guide device.

In this way, the first object on which the disclosure is based is achieved, that is to say a supercharged internal combustion engine is provided by which the disadvantages described above are overcome and the supercharging behavior of which, in particular in the presence of small compressor flows, is noticeably improved.

To realize a considerable reduction in nitrogen oxide emissions, high exhaust-gas recirculation rates are required which may necessitate an additional exhaust-gas recirculation arrangement, for which purpose, according to the disclosure, a high-pressure EGR arrangement is additionally provided. An advantage of the high-pressure EGR arrangement is that there is an adequately high pressure gradient for the delivery of the exhaust gas, and the exhaust gas does not have to be subjected to exhaust-gas aftertreatment.

In the context of the present disclosure, the orientation of the flow ports of the second annular duct in the manner of a secant means that the virtual elongation of each flow port intersects the curved inner wall of the intake system and, in particular, encompasses the extreme situation in which the virtual elongation of a flow port runs tangentially with respect to the outer circumference of the compressor impeller, that is to say, in a projection, constitutes or forms a tangent with respect to the compressor impeller.

Examples of the internal combustion engine are advantageous in which the compressor of the at least one exhaust-gas turbocharger is a radial compressor. This embodiment permits dense packaging of the exhaust-gas turbocharger and thus of the supercharging arrangement as a whole. The compressor housing may be in the form of a spiral or worm housing, wherein the diversion of the charge-air flow in the compressor of the exhaust-gas turbocharger can advantageously be utilized for conducting the compressed charge air on the shortest path from the outlet side, on which the turbine of the exhaust-gas turbocharger is arranged, to the inlet side.

In this connection, examples of the internal combustion engine are advantageous in which the turbine of the at least one exhaust-gas turbocharger is a radial turbine. This example likewise permits dense packaging of the exhaust-gas turbocharger and thus of the supercharging arrangement as a whole.

By contrast to turbines, compressors are defined in terms of their exit flow. A radial compressor is thus a compressor whose flow exiting the rotor blades runs substantially radially. In the context of the present disclosure, "substantially radially" means that the speed component in the radial direction is greater than the axial speed component.

Examples of the internal combustion engine may also be advantageous in which the compressor of the at least one exhaust-gas turbocharger is an axial compressor. The flow exiting the impeller blades of an axial compressor runs substantially axially.

Examples of the internal combustion engine are advantageous in which the compressor of the at least one exhaust-gas turbocharger has an inlet region which runs coaxially with respect to the shaft of the compressor and which is designed such that the flow of charge air approaching the compressor runs substantially axially.

In the case of an axial flow approaching the compressor, a diversion or change in direction of the charge-air flow in the intake system upstream of the compressor impeller is often omitted, whereby unnecessary pressure losses in the charge-air flow owing to flow diversion are avoided, and the pressure of the charge air at the inlet into the compressor of the exhaust-gas turbocharger is increased.

Examples of the internal combustion engine are advantageous in which the at least two annular ducts are arranged adjacent to one another and are separated from one another at least in sections by a wall. Adjacency of the at least two annular ducts ensures compact packaging, and makes it possible for the exhaust-gas flow rates that are introduced into the annular ducts to be adjusted, that is to say metered, by only one control element.

Examples of the internal combustion engine are advantageous in which the recirculation line system comprises a metering device by which exhaust gas extracted downstream of the turbine of the at least one exhaust-gas turbocharger can be distributed between the at least two annular ducts.

In this connection, examples of the internal combustion engine are advantageous in which the metering device has a control element by which, in a first working position, the first annular duct can be closed off at the exhaust-gas side.

The flow ports of the first annular duct are substantially for the introduction of exhaust gas for the purpose of realizing a predefined exhaust-gas recirculation rate. In this respect, it may be expedient if, in particular in the presence of low recirculation rates, said flow ports are closed and all of the exhaust gas for recirculation is introduced into the intake system via second annular ducts. Then, even in the case of low recirculation rates or low exhaust-gas flow rates for recirculation, it remains possible for a vortex to be generated around the shaft of the compressor upstream of the compressor impeller.

Nevertheless, the flow ports of the first annular duct also ensure a charge-air movement in the intake system, and thus thorough mixing of the recirculated exhaust gas with the fresh air, that is to say a homogenization of the charge air with regard to composition and temperature. This is advantageous with regard to the combustion that takes place in the cylinders, in particular in the case of a multi-cylinder internal combustion engine.

In this connection, examples of the internal combustion engine are also advantageous in which the metering device has a control element by which, in a second working position, the second annular duct can be closed off at the exhaust-gas side.

With the flow ports of the second annular duct, it is possible in particular in the presence of small compressor flows for the speed vector of the approaching flow to be manipulated. For as long as such manipulation is not required for optimizing the approaching flow, it may be expedient for said flow ports to be closed off, and for all of the exhaust gas for recirculation to be introduced into the intake system via first annular ducts.

In this connection, examples of the internal combustion engine are likewise advantageous in which the metering device has a control element by which, in a third working position, the first annular duct and the second annular duct can be connected to the exhaust-gas discharge system, and/or in a further working position, said first annular duct and second annular duct can be separated from the exhaust-gas discharge system. In the former case, the control element of the metering device serves for the distribution, between the annular ducts, of the exhaust gas which is extracted downstream of the turbine of the at least one exhaust-gas turbocharger and which is to be recirculated. In the latter case, the exhaust-gas recirculation arrangement is deactivated, that is to say shut off, by means of the control element. In this respect, the control element can basically also function as an EGR valve.

In this case, examples of the internal combustion engine are advantageous in which the metering device has a pivotable flap which serves as control element. A flap has already proven to be advantageous as an EGR valve, exhibits low susceptibility to faults, and is inexpensive.

Examples of the internal combustion engine are advantageous in which the first annular duct is arranged upstream of the second annular duct. This arrangement is advantageous because the second annular duct, which serves for generating the vortex upstream of the compressor impeller, is the annular duct that is situated close to the compressor, that is to say closest to the compressor. Therefore, the vortex that is formed cannot be disrupted or broken up again by another annular duct arranged downstream.

Examples of the internal combustion engine are advantageous in which the flow ports of the first annular duct and/or of the second annular duct are arranged so as to be spaced apart from one another at regular intervals.

Examples of the internal combustion engine are advantageous in which the at least two annular ducts surround the intake system over the full circumference of the intake system. In other words, the two annular ducts surround the entire circumference of the intake passage upstream of the compressor.

The two above examples support both the formation of a regular vortex and also the thorough mixing of the recirculated exhaust gas with the fresh air, that is to say the homogenization of the charge air in the intake system.

Examples of the internal combustion engine are advantageous in which the flow ports of the second annular duct, at least at the intake side and in a projection in the direction of the shaft, run tangentially with respect to the at least one compressor impeller. The virtual elongations of the flow ports are, in the projection, tangent to the outer circumference of the compressor impeller.

Examples of the internal combustion engine are advantageous in which the flow ports of the second annular duct are oriented correspondingly to the direction of rotation of the at least one compressor impeller.

Embodiments of the internal combustion engine are advantageous in which at least the inlet openings of the flow ports of the first annular duct are of circular form.

The second sub-object on which the disclosure is based, specifically that of specifying a method for operating an internal combustion engine of a type described above, in which the recirculation line system comprises a metering device by which exhaust gas extracted downstream of the turbine of the at least one exhaust-gas turbocharger can be distributed between the at least two annular ducts, is achieved by a method wherein, proceeding from an operating mode of the internal combustion engine in which exhaust gas is recirculated via the recirculation line system, an exhaust-gas fraction that is recirculated into the intake system via the second annular duct is increased if a charge-air flow rate to be supplied to the compressor decreases.

That which has already been stated with regard to the internal combustion engine according to the disclosure also applies to the method according to the disclosure, for which reason reference is generally made at this juncture to the statements made above with regard to the supercharged internal combustion engine. The different internal combustion engines require, in part, different method variants.

With the use of the method according to the disclosure, the surge limit of the compressor can be shifted further toward small compressor flows. In the case of small compressor flows, the flow approaching the compressor impeller, that is to say the speed vector of the charge-air flow, is manipulated by the second annular duct. An exhaust-gas vortex of greater or lesser intensity is generated, specifically by way of a greater or lesser amount of recirculated exhaust gas. Detachment of the charge-air flow from the blades of the compressor impeller is prevented.

Figure 2:
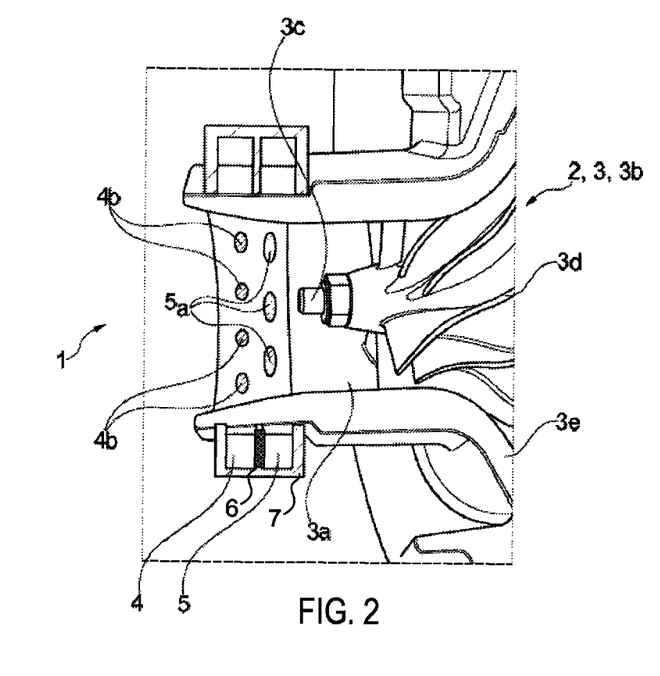
FIG. 2 schematically shows the compressor, arranged in the intake system, of the engine system of FIG. 1, partially in section.

FIG. 2 schematically shows the compressor 3, arranged in the intake system 1, of the engine system of FIG. 1, partially in section.

For the supply of the charge air to the cylinders, the internal combustion engine has an intake system 1, and for the supercharging of the cylinders, an exhaust-gas turbocharger is provided which comprises a turbine (not illustrated) arranged in the exhaust-gas discharge system and a compressor 3 arranged in the intake system 1. The compressor 3 is a radial compressor 3b, in the housing 3e of which an impeller 3d is mounted on a rotatable shaft 3c.

The compressor 3 of the exhaust-gas turbocharger 2 has an inlet region 3a which runs coaxially with respect to the shaft 3c of the compressor 3 and which is designed such that the flow of charge air approaching the compressor 3 of the exhaust-gas turbocharger 2 runs substantially axially and the section of the intake system 1 (e.g. the intake passage 42) upstream of the compressor 3 has no changes in direction.

The internal combustion engine is furthermore equipped with an exhaust-gas recirculation arrangement which comprises a recirculation line system which branches off from the exhaust-gas discharge system downstream of the turbine and which opens out into the intake system 1 upstream of the compressor 3 or compressor impeller 3d via the injector 7.

The injector 7 has two annular ducts 4, 5 which surround the intake passage in spiral form and over the full circumference of the passage upstream of the compressor impeller 3d, with multiple flow ports extending from each annular duct 4, 5, said ducts each being connected in terms of flow at the intake side, by way of an inlet opening 4b, 5b, to the intake system 1.

The second annular duct 5 serves for the generation of a vortex around the shaft 3c of the compressor 3 or around the virtual elongation of the shaft 3c, specifically in the direction of rotation of the shaft 3c. FIG. 3 shows the speed triangle without EGR, that is to say without a vortex, and FIG. 4 shows the speed triangle with EGR via the second annular duct, that is to say with a vortex.

As can be seen from FIGS. 3 and 4, the speed vector $v_{wheel}$ of the flow approaching the compressor impeller is made up of the speed vector $v_{charge}$ of the charge air in the intake system and the vector $v_C$ of the circumferential speed of the rotating compressor impeller.

Whereas, in FIG. 3, an exactly axial charge-air flow $v_{charge}$ is present, the speed vector $v_{charge}$ of the charge air in the intake system as per FIG. 4 has a component in the circumferential direction of the compressor wheel imparted to it owing to the recirculation of exhaust gas via the second annular duct. In this way, the angle α of the flow approaching the compressor impeller is increased. This is advantageous with regard to the flow approaching the impeller blades of the compressor impeller.

Figure 5:
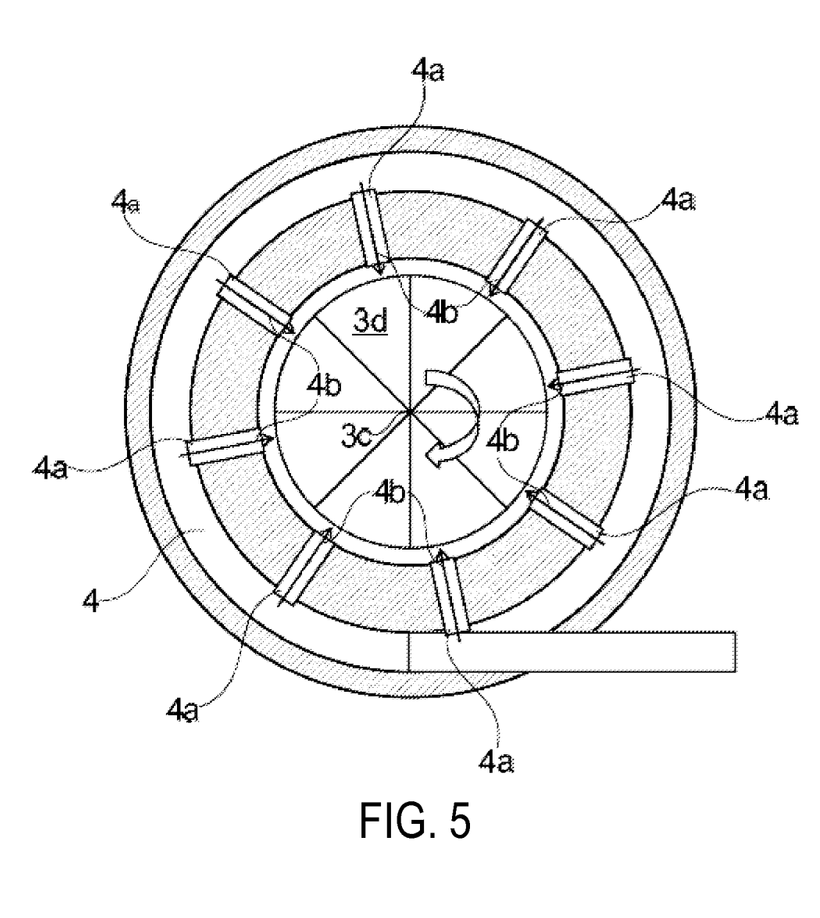
FIG. 5 schematically shows the compressor illustrated in FIG. 2, sectioned perpendicularly with respect to the shaft of the compressor along the first annular duct.

FIG. 5 shows a section perpendicular to the shaft 3c of the compressor impeller 3d and along the first annular duct 4 of the embodiment illustrated in FIG. 2. The first annular duct 4 has flow ports 4a which are oriented substantially radially with respect to the shaft 3c of the compressor and thus, in a virtual elongation, intersect the shaft 3c.

Figure 6:
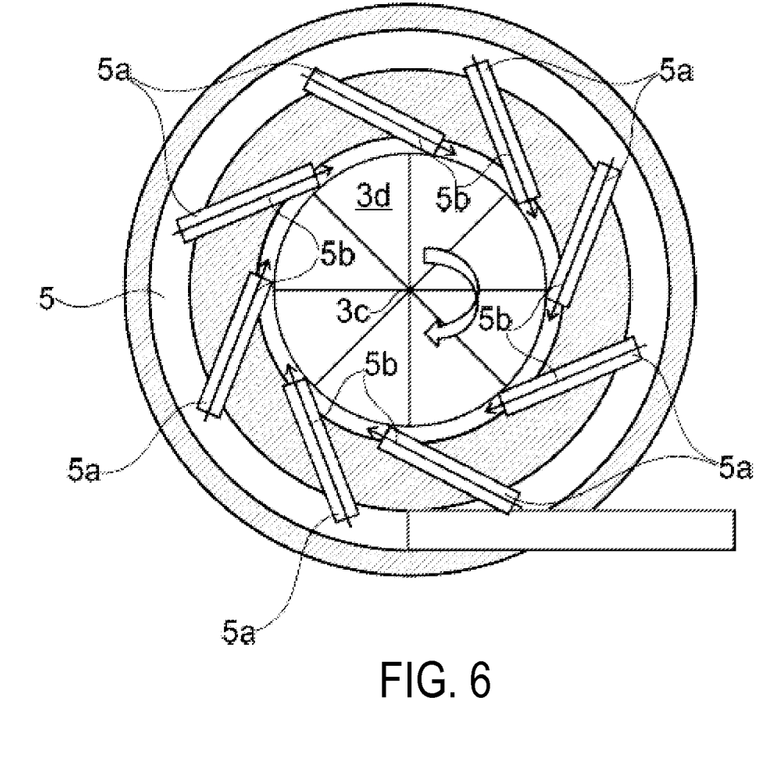
FIG. 6 schematically shows the compressor illustrated in FIG. 2, sectioned perpendicularly with respect to the shaft of the compressor along the second annular duct.

FIG. 6 shows a section perpendicular to the shaft 3c of the compressor impeller 3d and along the second annular duct 5 of the embodiment illustrated in FIG. 2. The second annular duct 5 has flow ports 5a which are oriented in the manner of a secant and thus, in a virtual elongation, do not intersect the shaft 3c of the compressor. The virtual elongation of each flow port 5a intersects the curved inner wall of the intake system, and in the present case is, in the projection, tangent to the outer circumference of the compressor impeller 3d.

As mentioned above, flow of EGR through one or both of the annular ducts may be controlled by a control element, also referred to as a valve. FIGS. 2, 7A, and 7B each illustrate a control valve 6 that may be adjusted to control flow through the injector 7. In FIG. 7B, valve 6 is in a first working position whereby flow through the first annular duct 4 is blocked. When the valve 6 is in the first working position, all EGR flow is directed through the second annular duct 5 and is dispersed into the intake air stream via only the flow ports 5a of the second annular duct 5. In FIG. 7A, valve 6 is in a second working position whereby flow through the second annular duct 5 is blocked. When the valve 6 is in the first working position, all EGR flow is directed through the first annular duct 4 and is dispersed into the intake air stream via only the flow ports 4a of the first annular duct 4. In FIG. 2, valve 6 is in a third working position whereby flow through both the first and second annular ducts is enabled and the EGR flow is dispersed into the intake air stream via the flow ports of both annular ducts. In some examples, the control valve 6 may be operable to block EGR flow through both the first and second annular ducts. In such examples, the EGR valve (e.g., valve 142) in the EGR passage may be dispensed with, or the EGR valve may be retained to provide additional control over the EGR flow rate, for example.

The controller 12 receives signals from the various sensors of FIG. 1 and employs the various actuators of FIG. 1 to adjust engine operation based on the received signals and instructions stored on a memory of the controller. For example, the controller may receive signals indicative of EGR flow rate, intake mass flow, speed, load, etc., and determine a desired position for the control valve 6. The controller may then send a signal to an actuator of the control valve 6 in order to move the control valve into the desired position. Accordingly, adjusting the amount of swirl upstream of the compressor may include adjusting an actuator of control valve 6 to adjust the amount of swirl. The actuator of the control valve may be an electric actuator (e.g., motor), solenoid, hydraulic, pneumatic, or other suitable actuator.

While the various working positions of the control valve 6 were described above as being either fully blocking either the first or second annular duct, or fully opening both the first and second annular ducts, in some examples the control valve 6 may be operable to partially block the first or second annular duct. For example, in the first working position, rather than fully blocking flow through the first annular duct, the control valve may additionally or alternatively be operable to partially block flow through the first annular duct such that at least some EGR still flows through the first annular duct. Likewise, in the second working position, rather than fully blocking flow through the second annular duct, the control valve may additionally or alternatively be operable to partially block flow through the second annular duct such that at least some EGR still flows through the second annular duct.

Thus, according to the examples described above, an engine system may include an LP EGR system to direct exhaust gas from downstream of a turbine to upstream of a compressor. The LP EGR system may include an injector to distribute/mix the EGR flow with the intake air prior to entering the compressor. The injector may include two flow ducts that circumferentially surround the intake passage. Each flow duct may include a plurality of flow ports, also referred to herein as ducts, through which the EGR may enter the intake passage. A first of the two flow ducts, also referred to herein as the first annular duct, may include flow ports having a circular shape, while a second of the two flow ducts, also referred to herein the as the second annular duct, may include flow ports having a substantially oval or elliptical shape. As used herein, circular may include a shape whereby the major and minor axes are equal or within a threshold range of each other, such as within 10% of each other. In contrast, an oval or elliptical shape may have major and minor axes that are different than each other, such as greater than 10% different. In the example illustrated in FIGS. 2, 7A, and 7B, the flow ports of the second flow duct may be oriented such that the major axis of each flow port is perpendicular to the rotational axis of the compressor and the minor axis of each flow port is parallel to the rotational axis of the compressor.

Additionally, in some examples each flow duct may have an equal number of flow ports, while in other examples the flow ducts may have different numbers of flow ports. For example, the elliptical flow ports of the second flow duct may be larger in at least one dimension than the circular flow ports of the first flow duct, for example the elliptical flow ports may have a longer axis that is perpendicular to the rotational axis of the compressor. As such, there may be fewer elliptical flow ports in the second flow duct than circular flow ducts in the first flow duct.

The EGR injector may have an inner circumferential surface that faces the interior of the injector where EGR flows. The EGR injector may have an outer circumferential surface that faces the intake passage upstream of the compressor. The outer circumferential surface may comprise the inner surface of the intake passage. The plurality of flow ports may extend across the inner and outer surface of the injector to create pathways for the EGR to travel from the injector the intake passage. The thickness of the injector between the inner and outer surfaces may be a suitable thickness that creates the desired radial and tangential flow through the ports. For example, as shown in FIG. 2, the injector thickness between the inner and outer surfaces may greater in the region of the second flow duct than the first flow duct. Further, in some examples the flow ports may be angled from the inner surface to the outer surface.

As explained previously, the flow ports of the first flow duct may provide for introduction of the EGR into the intake passage in a substantially radial direction, while the flow ports of the second flow duct may provide for introduction of the EGR into the intake passage in a substantially tangential direction with respect to the rotational axis of the compressor. By introducing the EGR in a radial direction, little or no swirl may be created in the EGR flow. In contrast, by introducing the EGR in a tangential direction, swirl may be created in the EGR flow. Further, the flow ports in the second flow duct may be configured such that the swirl introduced in the EGR is in the same direction as the rotation of the compressor.

By introducing swirl in the EGR/intake air upstream of the compressor, compressor surge may be mitigated due to decreased pressure ratio across the compressor, for example. However, it may be undesirable to introduce swirl at all operating points, as it may increase noise or produce other unwanted effects. Thus, the amount of swirl introduced may be controlled via a control valve that selectively directs EGR flow through the two flow ducts. If an increase in swirl is desired, the control valve may be adjusted so that more EGR flows through the second flow duct than the first flow duct, for example.

Thus, the systems described above provide for an exhaust gas recirculation (EGR) injector that includes a first circumferential flow duct having a plurality of radial flow ports; a second circumferential flow duct having a plurality of tangential flow ports; and a control valve adjustable to direct EGR flow through the first flow duct, second flow duct, or both the first and second flow ducts. In some examples the control valve may be integrated within the injector, while in other examples the control valve may be positioned in an EGR passage upstream of the injector, where the passage is bifurcated leading to the two different flow ducts of the injector. As described above, the radial flow ports provide EGR with a radial velocity while the tangential flow ports provide EGR with a tangential velocity. The control valve enables a desired fraction of the EGR to flow through one or both of the flow ducts in order to create desired swirl. The EGR injector may be positioned around or as part of an intake passage upstream of a compressor such that the EGR provided via the flow ports of the flow ducts is mixed with intake air prior to impinging on the compressor.

Turning to FIG. 8, a method 800 for mitigating surge with an EGR injector is provided. At least portions of method 800 may be implemented as executable controller instructions stored in non-transitory memory. Additionally, portions of method 800 may be actions taken in the physical world to transform an operating state of an actuator or device. Instructions for carrying out method 800 may be executed by a controller (e.g., controller 12) based on instructions stored on a memory of the controller and in conjunction with signals received from sensors of the engine system, such as the sensors described above with reference to FIG. 1. The controller may employ engine actuators of the engine system to adjust engine operation, according to the method described below. For example, method 800 may adjust the position of a control valve (e.g., valve 6 of FIG. 2) positioned in an EGR flow path just upstream or within the EGR injector (e.g., injector 7 of FIG. 2) to direct a designated fraction of EGR through a flow duct of the injector that includes tangential flow ports in order to create swirl to avoid surge.

Method 800 includes, at 802, determining engine operating parameters. The determined operating parameters may include, but are not limited to, engine speed and load, intake mass air flow, EGR flow rate, compressor pressure ratio, and other parameters. At 804, method 800 determines if LP EGR flow is enabled. LP EGR flow may be enabled based on engine speed and load, for example, or based on exhaust NOx concentration. The controller may determine is LP EGR flow is enabled based on a position of an EGR valve, flow rate through an EGR passage, engine operating conditions, or other mechanism.

If it is determined that LP EGR flow is not enabled, method 800 proceeds to 806 to maintain a control valve (e.g., valve 6) in an EGR injector at a default position, and then method 800 proceeds to 810, which will be described in more detail below. If it is determined that LP EGR flow is enabled, method 800 proceeds to 808 to adjust the control valve position to create a designated amount of swirl for the current conditions. For example, the controller may include a look-up table mapping control valve position to EGR flow rate, engine speed and load, compressor conditions (e.g., mass flow through the compressor and pressure ratio across the compressor), and/or other parameters. The control valve may be set a position to provide a designated amount of swirl for maintaining the compressor below its surge line, for example.

At 810, method 800 determines if surge is detected. Compressor surge may be detected based on compressor flow rate and pressure ratio across the compressor, for example. If it is determined the compressor is not operating in surge, method 800 returns. If it is determined the compressor is operating in surge, or if the compressor is operating near its surge line and thus is predicted it could operate in the surge region in the immediate future, method 800 proceeds to 812 to adjust the control valve to increase the amount of swirl. To increase the amount of swirl, the control valve may be adjusted so that a portion or an entirety of the EGR flows through the flow duct of the EGR injector that creates swirl by providing the EGR into the intake passage via tangential flow ports. In some examples, this may include moving the control valve from its designated position based on conditions. In other examples, such as when LP EGR is not currently enabled, this may additionally or alternatively include enabling LP EGR. Method 800 then returns.

Thus, the method described above provides for during a first condition, flowing exhaust gas from downstream of a turbine to upstream of a compressor via a tangential flow duct of an exhaust gas recirculation (EGR) injector circumferentially surrounding an intake passage upstream of the compressor, and during a second condition, flowing exhaust gas from downstream of the turbine to upstream of the compressor via a radial flow duct of the EGR injector. The tangential flow duct may be the second annular flow duct described above and may include elliptical flow ports that introduce a tangential velocity to the exhaust gas flow. The radial flow duct may be the first annular flow duct described above and may include circular flow ports that introduce a radial velocity to the exhaust gas flow.

In one example, the first condition may be compressor mass flow below a first threshold, and the second condition may be compressor mass flow above a second threshold. If compressor mass flow is between the two thresholds, the flow of exhaust gas from downstream of the turbine to upstream of the compressor may be split between the tangential flow duct and the radial flow duct. To control flow of exhaust gas between the two flow ducts, a position of a control valve of the EGR may be adjusted. In a first position of the control valve, all the exhaust may flow through the tangential flow duct while exhaust is blocked from flowing through the radial position. In a second position of the control valve, all the exhaust may flow through the radial flow duct while exhaust is blocked from flowing though the tangential flow duct. In a third position of the control valve, exhaust may flow through both the radial and the tangential flow ducts.

In this way, variable levels of induced swirl can be adjusted by controlling distribution of EGR mass flow between tangential- and radial port ducts of an EGR injector. Variable swirl levels according to varying requirements based on air mass flow and compressor speed can be induced by EGR flow distribution between the two ducts. The compressor surge line may then be moved towards lower mass flow conditions in a wide operating range, and compressor surge can be avoided at part load operation. This may be accomplished without using a special device upstream of the compressor to induce swirl, reducing unwanted flow restrictions upstream of the compressor.

The technical effect of distributing EGR via a tangential or radial flow duct is to induce swirl in the EGR and intake air upstream of the compressor in order to avoid surge, particularly as lower mass flow conditions.

An embodiment is directed to a supercharged internal combustion engine having an intake system for supply of charge air, an exhaust-gas discharge system for discharge of exhaust gas, at least one exhaust-gas turbocharger which comprises a turbine arranged in the exhaust-gas discharge system and a compressor arranged in the intake system, the compressor being equipped with at least one impeller which is mounted on a rotatable shaft in a compressor housing, an exhaust-gas recirculation arrangement comprising a recirculation line system which branches off from the exhaust-gas discharge system downstream of the turbine of the at least one exhaust-gas turbocharger and which opens out into the intake system upstream of the at least one compressor impeller, and an additional exhaust-gas recirculation arrangement which comprises a line which branches off from the exhaust-gas discharge system upstream of the turbine and which opens out into the intake system again downstream of the compressor, wherein the recirculation line system comprises at least two annular ducts which surround the intake system in spiral form at least in sections upstream of the at least one compressor impeller, with multiple flow ports extending from each annular duct, said ducts each being connected in terms of flow at an intake side, by way of an inlet opening, to the intake system, a first annular duct of the at least two annular ducts has flow ports which, at least at the intake side, are oriented substantially radially with respect to the shaft of the compressor and thus, in a virtual elongation, intersect the shaft, and a second annular duct of the at least two annular ducts has flow ports which, at least at the intake side, are oriented in the manner of a secant and thus, in a virtual elongation, do not intersect the shaft of the compressor.

In a first example of the supercharged internal combustion engine, the compressor of the at least one exhaust-gas turbocharger is a radial compressor. A second example of the supercharged internal combustion engine optionally includes the first example and further includes the compressor of the at least one exhaust-gas turbocharger being an axial compressor. A third example of the supercharged internal combustion engine optionally includes one or both of the first and second examples and further includes the compressor of the at least one exhaust-gas turbocharger having an inlet region which runs coaxially with respect to the shaft of the compressor and which is designed such that the flow of charge air approaching the compressor runs substantially axially. A fourth example of the supercharged internal combustion engine optionally includes one or more or each of the first through third examples and further includes the at least two annular ducts being arranged adjacent to one another and separated from one another at least in sections by a wall. A fifth example of the supercharged internal combustion engine optionally includes one or more or each of the first through fourth examples and further includes wherein the recirculation line system comprises a metering device by which exhaust gas extracted downstream of the turbine of the at least one exhaust-gas turbocharger is distributed between the at least two annular ducts. A sixth example of the supercharged internal combustion engine optionally includes one or more or each of the first through fifth examples and further includes wherein the metering device has a control element by which, in a first working position, the first annular duct is closed off at the exhaust-gas side. A seventh example of the supercharged internal combustion engine optionally includes one or more or each of the first through sixth examples and further includes wherein in a second working position of the control element, the second annular duct is closed off at the exhaust-gas side. An eighth example of the supercharged internal combustion engine optionally includes one or more or each of the first through seventh examples and further includes wherein in a third working position of the control element, the first annular duct and the second annular duct are connected to the exhaust-gas discharge system. A ninth example of the supercharged internal combustion engine optionally includes one or more or each of the first through eighth examples and further includes wherein the metering device has a pivotable flap which serves as the control element. A tenth example of the supercharged internal combustion engine optionally includes one or more or each of the first through ninth examples and further includes wherein the first annular duct is arranged upstream of the second annular duct. An eleventh example of the supercharged internal combustion engine optionally includes one or more or each of the first through tenth examples and further includes wherein the flow ports of the first annular duct and/or of the second annular duct are arranged so as to be spaced apart from one another at regular intervals. A twelfth example of the supercharged internal combustion engine optionally includes one or more or each of the first through eleventh examples and further includes wherein the at least two annular ducts surround the intake system over its full circumference. A thirteenth example of the supercharged internal combustion engine optionally includes one or more or each of the first through twelfth examples and further includes wherein the flow ports of the second annular duct, at least at the intake side and in a projection in a direction of the shaft, run tangentially with respect to the at least one compressor impeller. A fourteenth example of the supercharged internal combustion engine optionally includes one or more or each of the first through thirteenth examples and further includes wherein the flow ports of the second annular duct are oriented correspondingly to a direction of rotation of the at least one compressor impeller. A fifteenth example of the supercharged internal combustion engine optionally includes one or more or each of the first through fourteenth examples and further includes wherein at least the inlet openings of the flow ports of the first annular duct are of circular form.

An embodiment of a method comprises during a first condition, flowing exhaust gas from downstream of a turbine to upstream of a compressor via a tangential flow duct of an exhaust gas recirculation (EGR) injector circumferentially surrounding an intake passage upstream of the compressor; and during a second condition, flowing exhaust gas from downstream of the turbine to upstream of the compressor via a radial flow duct of the EGR injector.

In a first example of the method, the first condition comprises compressor mass flow below a first threshold, and wherein the second condition comprises compressor mass flow above a second threshold. A second example of the method optionally includes the first example and further comprises a adjusting a position of a control valve of the EGR injector to flow the exhaust gas through the tangential flow duct or radial flow duct.

An embodiment of an exhaust gas recirculation (EGR) injector comprises a first circumferential flow duct having a plurality of radial flow ports; a second circumferential flow duct having a plurality of tangential flow ports; and a control valve adjustable to direct EGR flow through the first flow duct, second flow duct, or both the first and second flow ducts. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
when compressor mass flow is below a first threshold, operating an engine and flowing exhaust gas generated by the engine from downstream of a turbine to upstream of a compressor via a tangential flow duct of an exhaust gas recirculation (EGR) injector circumferentially surrounding an intake passage upstream of the compressor; and
when compressor mass flow is above a second threshold, operating the engine and flowing exhaust gas generated by the engine from downstream of the turbine to upstream of the compressor via a radial flow duct of the EGR injector.

2. The method of claim 1, wherein the first threshold is less than the second threshold, and further comprising when compressor mass flow is between the first threshold and the second threshold, operating the engine and flowing exhaust gas generated by the engine from downstream of the turbine to upstream of the compressor via the tangential flow duct and the radial flow duct of the EGR injector.

3. The method of claim 1, further comprising adjusting a position of a control valve of the EGR injector to flow the exhaust gas through the tangential flow duct or radial flow duct.

4. A supercharged internal combustion engine comprising:
an intake system for supply of charge air,
an exhaust-gas discharge system for discharge of exhaust gas,
at least one exhaust-gas turbocharger which comprises a turbine arranged in the exhaust-gas discharge system and a compressor arranged in the intake system, the compressor being equipped with at least one impeller which is mounted on a rotatable shaft in a compressor housing,
an exhaust-gas recirculation arrangement comprising a recirculation line system which branches off from the exhaust-gas discharge system downstream of the turbine of the at least one exhaust-gas turbocharger and which opens out into the intake system upstream of the at least one compressor impeller, and
an additional exhaust-gas recirculation arrangement which comprises a line which branches off from the exhaust-gas discharge system upstream of the turbine and which opens out into the intake system again downstream of the compressor, wherein the recirculation line system comprises at least two ducts which surround the intake system in spiral form at least in sections upstream of the at least one compressor impeller, with multiple flow ports extending from each duct, said ducts each being connected in terms of flow at an intake side, by way of an inlet opening, to the intake system, wherein a first duct of the at least two ducts has flow ports which, at least at the intake side, are oriented radially with respect to the shaft of the compressor and thus have respective central longitudinal axes that each intersect the shaft, and wherein a second duct of the at least two ducts has flow ports which, at least at the intake side, are oriented in the manner of a secant and thus have respective central longitudinal axes that each does not intersect the shaft.

5. The supercharged internal combustion engine as claimed in claim 4, wherein the compressor of the at least one exhaust-gas turbocharger is a radial compressor.

6. The supercharged internal combustion engine as claimed in claim 4, wherein the compressor of the at least one exhaust-gas turbocharger is an axial compressor.

7. The supercharged internal combustion engine as claimed claim 4, wherein the compressor of the at least one exhaust-gas turbocharger has an inlet region which runs coaxially with respect to the shaft of the compressor and which is designed such that the flow of charge air approaching the compressor runs axially.

8. The supercharged internal combustion engine as claimed in claim 4, wherein the at least two ducts are arranged adjacent to one another and are separated from one another at least in sections by a wall.

9. The supercharged internal combustion engine as claimed in claim 4, wherein the recirculation line system comprises a control valve by which exhaust gas extracted downstream of the turbine of the at least one exhaust-gas turbocharger is distributed between the at least two annular ducts.

10. The supercharged internal combustion engine as claimed in claim 9, wherein the control valve has a control element by which, in a first working position, the first duct is closed off at an exhaust-gas side.

11. The supercharged internal combustion engine as claimed in claim 10, wherein in a second working position of the control element, the second duct is closed off at the exhaust-gas side.

12. The supercharged internal combustion engine as claimed in claim 11, wherein in a third working position of the control element, the first duct and the second duct are connected to the exhaust-gas discharge system.

13. The supercharged internal combustion engine as claimed in claim 10, wherein the control valve has a pivotable flap which serves as the control element.

14. The supercharged internal combustion engine as claimed claim 4, wherein the first duct is arranged upstream of the second duct.

15. The supercharged internal combustion engine as claimed in claim 4, wherein the flow ports of the first duct and/or of the second duct are arranged so as to be spaced apart from one another at regular intervals.

16. The supercharged internal combustion engine as claimed in claim 4, wherein the at least two ducts surround the intake system over its full circumference.

17. The supercharged internal combustion engine as claimed in claim 4, wherein the flow ports of the second duct, at least at the intake side and in a projection in a direction of the shaft, run tangentially with respect to the at least one compressor impeller.

18. The supercharged internal combustion engine as claimed in claim 4, wherein the flow ports of the second annular duct are oriented correspondingly to a direction of rotation of the at least one compressor impeller.

19. The supercharged internal combustion engine as claimed in claim 4, wherein at least the inlet openings of the flow ports of the first annular duct are of circular form.

* * * * *